US012569813B2

(12) United States Patent
Hagawa et al.

(10) Patent No.: US 12,569,813 B2
(45) Date of Patent: Mar. 10, 2026

(54) METHOD AND PROGRAM FOR DETERMINING CLEANING TROUBLE IN FRESH WATER GENERATOR

(71) Applicant: Toray Industries, Inc., Tokyo (JP)

(72) Inventors: Kazuki Hagawa, Otsu (JP); Kazunori Tomioka, Otsu (JP); Hiroshi Hamada, Otsu (JP)

(73) Assignee: Toray Industries, Inc., Tokyo (JP)

( * ) Notice: Subject to any disclaimer, the term of this patent is extended or adjusted under 35 U.S.C. 154(b) by 697 days.

(21) Appl. No.: 17/915,204

(22) PCT Filed: Mar. 26, 2021

(86) PCT No.: PCT/JP2021/013127
§ 371 (c)(1),
(2) Date: Sep. 28, 2022

(87) PCT Pub. No.: WO2021/200752
PCT Pub. Date: Oct. 7, 2021

(65) Prior Publication Data
US 2023/0121715 A1     Apr. 20, 2023

(30) Foreign Application Priority Data

Mar. 30, 2020     (JP) ................................. 2020-059606

(51) Int. Cl.
B01D 65/02          (2006.01)
C02F 1/44           (2023.01)

(52) U.S. Cl.
CPC ............... B01D 65/02 (2013.01); C02F 1/44 (2013.01); B01D 2321/16 (2013.01);
(Continued)

(58) Field of Classification Search
CPC ........................... B01D 65/02; B01D 2321/16; B01D 2321/40; C02F 1/44; C02F 2209/44; C02F 2303/16
See application file for complete search history.

(56) References Cited

U.S. PATENT DOCUMENTS

2004/0108268 A1\*  6/2004  Liu ........................ B01D 61/22
                                                     210/903
2011/0056522 A1\*  3/2011  Zauner ................... B01D 65/02
                                                     134/27
(Continued)

FOREIGN PATENT DOCUMENTS

CN          104603064 A      5/2015
CN          108602021 A      9/2018
(Continued)

OTHER PUBLICATIONS

Chinese Office Action for Chinese Application No. 202180025950.8, dated Jul. 21, 2023 with translation, 26 pages.
(Continued)

*Primary Examiner* — Patrick Orme
(74) *Attorney, Agent, or Firm* — Buchanan Ingersoll & Rooney PC

(57) ABSTRACT
The present invention provides a fresh water generator operating method and a determination program that are employed in a method for cleaning a separation membrane module following membrane filtration, and that, while various cleaning steps such as reverse pressure cleaning, air cleaning, chemical solution cleaning are taking place after completion of the membrane filtration, determines cleaning troubles by calculating a temporal change in resistance increase rate on the basis of an increase in membrane differential pressure.

11 Claims, 5 Drawing Sheets

(52) U.S. Cl.
CPC ...... *B01D 2321/40* (2013.01); *C02F 2209/44* (2013.01); *C02F 2303/16* (2013.01)

(56) References Cited

U.S. PATENT DOCUMENTS

2013/0306559 A1 * 11/2013 Kantani ................ C02F 3/1273
210/636
2015/0321934 A1 * 11/2015 Kobayashi ............ B01D 61/16
210/724
2019/0184343 A1    6/2019 Hagawa et al.

FOREIGN PATENT DOCUMENTS

| | | | |
|---|---|---|---|
| CN | 109289530 A | 2/2019 | |
| CN | 109311704 A | 2/2019 | |
| CN | 109562965 A | 4/2019 | |
| JP | 11169851 A | 6/1999 | |
| JP | 2003300071 A | 10/2003 | |
| JP | 2006021066 A * | 1/2006 | |
| JP | 2011115705 A | 6/2011 | |
| JP | 2011189287 A | 9/2011 | |
| WO | WO-2017135235 A1 * | 8/2017 | ............. B01D 65/02 |
| WO | WO-2017221984 A1 * | 12/2017 | ............. B01D 65/00 |

OTHER PUBLICATIONS

International Search Report and Written Opinion for International Application No. PCT/JP2021/013127, dated May 18, 2021, 6 pages.
Japanese Written Description of Circumstances for Accelerated Examination for Japanese Application No. 2021-538722, dated Jan. 14, 2022, with translation, 26 pages.

* cited by examiner

METHOD AND PROGRAM FOR DETERMINING CLEANING TROUBLE IN FRESH WATER GENERATOR

CROSS REFERENCE TO RELATED APPLICATIONS

This application is the U.S. National Phase of PCT/JP2021/013127, filed Mar. 26, 2021, which claims priority to Japanese Patent Application No. 2020-059606, filed Mar. 30, 2020, the disclosures of these applications being incorporated herein by reference in their entireties for all purposes.

FIELD OF THE INVENTION

The present invention relates to a method for determining a cleaning trouble and insufficient cleaning in a fresh water generator that obtains filtered water by filtering water to be treated with a separation membrane module, a cleaning trouble determination program, and a storage medium including the determination program.

BACKGROUND OF THE INVENTION

A fresh water generator using a membrane separation method has characteristics such as energy saving, space saving and improvement in filtered water quality, and thus use thereof in various fields is expanding. For example, a microfiltration membrane or an ultrafiltration membrane is applied to a water purification process of producing industrial water or tap water from river water, groundwater, or sewage-treated water, or pretreatment in a seawater desalination reverse osmosis membrane treatment step.

When raw water is subjected to membrane filtration in a filtration step, an adhesion amount of contaminants on a membrane surface or inside membrane pores increases in association with a membrane filtered water amount, and a reduction in the filtered water amount or an increase in a transmembrane pressure difference, that is, fouling of a membrane, becomes a problem.

Therefore, a first cleaning step such as performing air scrubbing and backwashing, and a second cleaning step have been put into practical use. The air scrubbing is to scrape off adhering substances on the membrane surface by introducing air bubbles to a raw water side of the membrane after ending of each filtration step, vibrating the membrane, and bringing respective parts of the membrane into contact with each other. The backwashing is to remove the contaminants adhering on the membrane surface or inside the membrane pores by adding membrane filtered water, clear water, or a low concentration of sodium hypochlorite, and forcing it by pressure to flow in a direction opposite to a direction in a membrane filtration method. The second cleaning step is to add a relatively high concentration of sodium hypochlorite to backwash water or using ozone-containing water in the backwash water after a plurality of the filtration steps and the first cleaning steps in order to further enhance a cleaning effect.

In order to realize stable operation of a membrane filtration system, Patent Literature 1 describes controlling a frequency of physical cleaning based on a transmembrane pressure difference, and Patent Literature 2 describes adjusting an ozone supply amount during cleaning based on a membrane inlet pressure or a transmembrane pressure difference.

PATENT LITERATURE

Patent Literature 1: JPH11-169851A
Patent Literature 2: JP2003-300071A

SUMMARY OF THE INVENTION

In order to realize stable operation of a fresh water generator using a separation membrane module, it is important to determine a removal status of a fouling substance in a first cleaning step and a second cleaning step, but a problem arises that the membrane filtration system cannot be sufficiently stabilized even when a cleaning condition control method described in Patent Literatures 1 and 2 is performed. For example, even when the control method in Patent Literature 2 is performed with respect to an increase in transmembrane pressure difference due to a trouble or insufficiency in the first cleaning step after the end of each filtration step, the increase in transmembrane pressure difference is not improved, and only an amount of consumed chemical solution is increased.

Therefore, the present invention provides a fresh water generator using membrane separation that can be stably operated by determining a trouble and insufficiency in a first cleaning step and a second cleaning step based on an increase in transmembrane pressure difference and performing cleaning control based on a determination result.

In order to solve the above problem, determination of a cleaning trouble in a fresh water generator using a separation membrane module according to the present invention is specified as follows.

(1) A method for determining cleaning trouble in a fresh water generator, the method including:
a filtration step of filtering water to be treated by a separation membrane to obtain treated water;
a first cleaning step of cleaning the separation membrane at the end of each filtration step; and
a second cleaning step of, after a step of performing the first cleaning step following the filtration step a plurality of times, chemically cleaning the separation membrane with a high concentration chemical solution following the filtration step or the first cleaning step,
in which a cleaning trouble is determined based on at least one of a temporal change A in a resistance increase rate between a plurality of the first cleaning steps which is calculated based on the resistance increase rate during the filtration step or a temporal change B in the resistance increase rate between a plurality of the second cleaning steps.

(2) The method for determining cleaning trouble in a fresh water generator according to (1), in which the temporal change A in the resistance increase rate and the temporal change B in the resistance increase rate are respectively calculated based on slopes of regression lines obtained by a least square method, or the following Equations (1) and (2).

[Equation 1]

$$\frac{\Delta\left(\dfrac{\Delta R_{filt\_cycle}}{\Delta t_{filt\_cycle}}\right)}{\Delta t_{filt\_1st}} = \text{temporal change } A \text{ in resistance increase rate} \tag{1}$$

$\Delta R_{filt\_cycle}$: resistance increase during filtration step $\Delta t_{filt\_cycle}$: time of filtration step $\Delta t_{filt\_1st}$: total filtration time between first cleaning steps

[Equation 2]

$$\Delta\left(\frac{\Delta R_{after2nd\_filt\_cycle}}{\Delta t_{filt\_cycle}}\right) = \text{temporal change } B \text{ in resistance increase rate} \tag{2}$$

$\Delta R_{after2nd\_filt\_cycle}$: resistance increase during filtration step immediately after second cleaning step $\Delta t_{filt\_2nd}$: total filtration time between second cleaning steps (3) The method for determining cleaning trouble in a fresh water generator according to (1) or (2), in which when the temporal change A in the resistance increase rate is larger than a reference value, insufficiency or a trouble in the first cleaning step is determined.

(4) The method for determining cleaning trouble in a fresh water generator according to (1) or (2), in which when the temporal change B in the resistance increase rate is larger than a reference value, insufficiency or a trouble in the second cleaning step is determined.

(5) The method for determining cleaning trouble in a fresh water generator according to (1) or (2), in which change amounts or change rates of the temporal change A in the resistance increase rate and the temporal change B in the resistance increase rate from a reference value are compared, insufficiency or a trouble in the first cleaning step is determined when an increase of the temporal change A in the resistance increase rate is larger, and insufficiency or a trouble in the second cleaning step is determined when an increase of the temporal change B in the resistance increase rate is larger.

(6) The method for determining cleaning trouble in a fresh water generator according to any of (1) to (5), in which in determination of the cleaning trouble in the second cleaning step, the cleaning trouble in the second cleaning step is determined by combining, as an index, at least one selected from a pH, an ORP, a residual chlorine concentration, and a chemical solution storage tank liquid level of the chemical solution.

(7) The method for determining cleaning trouble in a fresh water generator according to any of (1) to (6), in which the resistance increase rate during the filtration step is corrected by at least one of water to be treated quality data among a turbidity, an organic substance concentration, an inorganic substance concentration, a flocculant concentration, a water temperature, and a viscosity.

(8) A method for operating a fresh water generator, the method including:

changing at least one of a condition and a frequency of the first cleaning step when insufficiency or a trouble in the first cleaning step is determined by the method for determining cleaning trouble according to any of (1) to (7), and changing at least one of a condition and a frequency of the second cleaning step when insufficiency or a trouble in the second cleaning step is determined by the method for determining cleaning trouble.

(9) A program for determining cleaning trouble in a fresh water generator, the program including:

a filtration step of filtering water to be treated by a separation membrane to obtain treated water;

a first cleaning step of cleaning the separation membrane at the end of each filtration step; and a second cleaning step of, after a step of performing the first cleaning step following the filtration step a plurality of times, chemically cleaning the separation membrane with a high concentration chemical solution following the filtration step or the first cleaning step, in which the program causes a computer to function as the following units:

a resistance increase rate temporal change calculation unit configured to calculate, using a resistance increase rate during the filtration step, at least one of a temporal change A in the resistance increase rate between a plurality of the first cleaning steps or a temporal change B in the resistance increase rate between a plurality of the second cleaning steps; and a cleaning trouble determination unit based on at least one of the temporal change A in the resistance increase rate and the temporal change B in the resistance increase rate between the plurality of the second cleaning steps which are calculated by the resistance increase rate temporal change calculation unit.

(10) The program for determining cleaning trouble according to (9), causing the computer to function as the resistance increase rate temporal change calculation unit configured to respectively calculate the temporal change A in the resistance increase rate and the temporal change B in the resistance increase rate based on slopes of regression lines obtained by a least square method, or the following Equations (3) and (4).

[Equation 3]

$$\Delta\left(\frac{\Delta R_{filt\_cycle}}{\Delta t_{filt\_cycle}}\right) = \text{temporal change } A \text{ in resistance increase rate} \tag{3}$$

$\Delta R_{filt\_cycle}$: resistance increase during filtration step $\Delta t_{filt\_cycle}$: time of filtration step $\Delta t_{filt\_1st}$: total filtration time between first cleaning steps

[Equation 4]

$$\Delta\left(\frac{\Delta R_{after2nd\_filt\_cycle}}{\Delta t_{filt\_cycle}}\right) = \text{temporal change } B \text{ in resistance increase rate} \tag{4}$$

$\Delta R_{after2nd\_filt\_cycle}$: resistance increase during filtration step immediately after second cleaning step $\Delta t_{filt\_2nd}$: total filtration time between second cleaning steps

(11) The program for determining cleaning trouble according to (9) or (10), causing the computer to function as the following units:

a resistance increase rate temporal change recording unit configured to record a calculation result of the calculated temporal change A in the resistance increase rate; and the cleaning trouble determination unit configured to determine insufficiency or a trouble in the first cleaning step when the temporal change A in the resistance increase rate recorded in the resistance increase rate temporal change recording unit is larger than a reference value.

(12) The program for determining cleaning trouble according to (9) or (10), causing the computer to function as the following units:

a resistance increase rate temporal change recording unit configured to record a calculation result of the calculated temporal change B in the resistance increase rate; and the cleaning trouble determination unit configured to determine insufficiency or a trouble in the second cleaning step when the temporal change B in the resistance increase rate recorded in the resistance increase rate temporal change recording unit is larger than a reference value.

(13) The program for determining cleaning trouble according to (9) or (10), causing the computer to function as the following units:

a resistance increase rate temporal change recording unit configured to record calculation results of the calculated temporal changes A and B in the resistance increase rate; and the cleaning trouble determination unit configured to compare change amounts or change rates of the temporal change A in the resistance increase rate and the temporal change B in the resistance increase rate from a reference value recorded in the resistance increase rate temporal change recording unit, determine insufficiency or a trouble in the first cleaning step when an increase of the temporal change A in the resistance increase rate is larger, and determine insufficiency or a trouble in the second cleaning step when an increase of the temporal change B in the resistance increase rate is larger.

(14) The program for determining cleaning trouble according to any of (9) to (13), causing the computer to function as the following units:

a first cleaning step condition changing unit configured to change at least one of a condition and a frequency of the first cleaning step when insufficiency in the first cleaning step is determined; and a second cleaning step changing unit configured to change at least one of a condition and a frequency of the second cleaning step when insufficiency in the second cleaning step is determined.

(15) The program for determining cleaning trouble according to any of (9) to (14), causing the computer to function as the following units:

a chemical solution supply recording unit configured to record a pH, an ORP, a residual chlorine concentration, and a chemical solution storage tank liquid level in a chemical solution supply line; and the cleaning trouble determination unit configured to combine, as an index, at least one recorded in the chemical solution supply recording unit, in determination of cleaning trouble.

(16) The program for determining cleaning trouble according to any of (9) to (15), causing the computer to function as the following units:

a water to be treated quality recording unit configured to record at least one of water to be treated quality data among a turbidity, an organic substance concentration, an inorganic substance concentration, a flocculant concentration, a water temperature, and a viscosity in calculation of the resistance increase rate during the filtration step; and a correction unit configured to correct, by the water to be treated quality data recorded in the water to be treated quality recording unit, a calculation result obtained by the resistance increase rate temporal change calculation unit.

(17) A computer-readable storage medium storing the program for determining cleaning trouble in a fresh water generator according to any of (9) to (16).

According to the method and program for determining cleaning trouble of the present invention, an appropriate cleaning condition can be controlled and a fresh water generator can be stably operated by determining a cause of a cleaning trouble.

DETAILED DESCRIPTION OF EMBODIMENTS OF THE INVENTION

Figure 1:
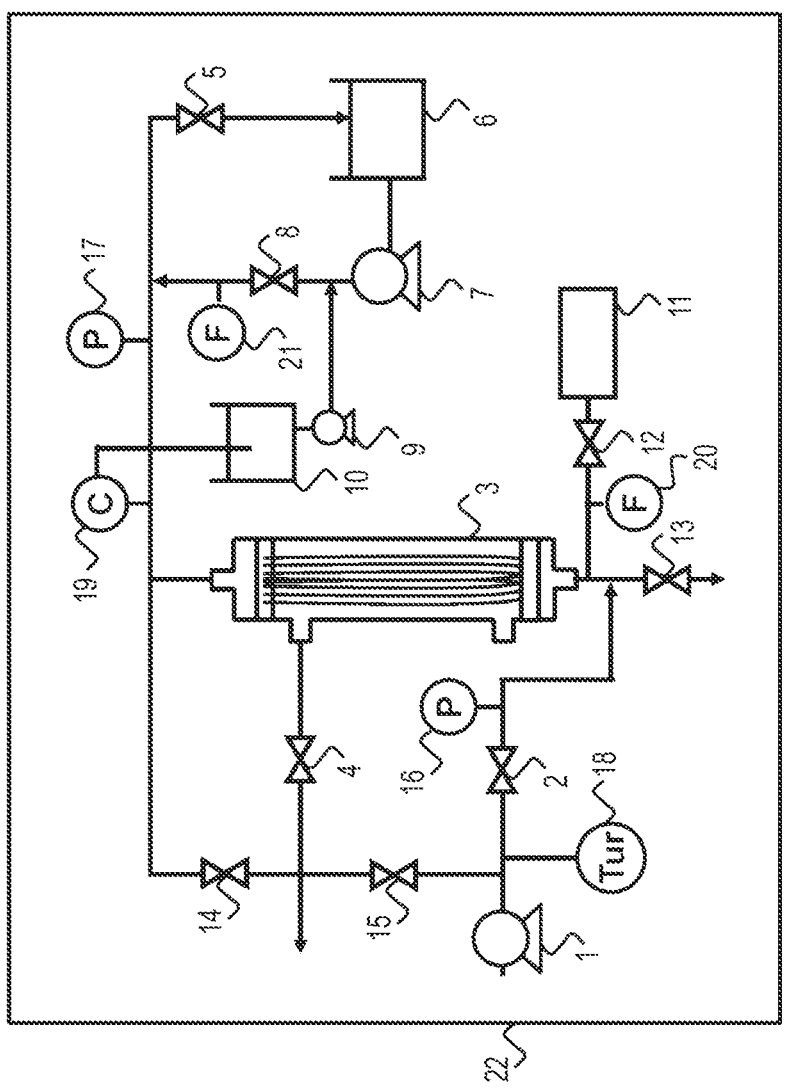
FIG. 1 is a device schematic flow diagram showing an example of a fresh water generator according to an embodiment of the present invention.

Hereinafter, the present invention will be described in more detail based on embodiments shown in the drawings. The present invention is not limited to the following embodiments.

The present invention relates to a cleaning trouble determination method and a cleaning trouble determination program for a separation membrane module. For example, as shown in FIG. 1, a fresh water generator 22 according to an embodiment of the present invention includes: a water to be treated supply pump 1 which supplies water to be treated; a water to be treated supply valve 2 which is opened when the water to be treated is supplied; a separation membrane module 3 which filters the water to be treated; an air vent valve 4 which is opened when backwashing or air scrubbing is performed; a treated water discharge valve 5 which is opened when membrane filtration is performed; a treated water storage tank 6 which stores treated water; a back-washing pump 7 which supplies the treated water to the separation membrane module 3 to perform the backwashing; a backwashing valve 8 which is opened when the backwashing is performed; a chemical solution supply pump 9 which supplies a chemical solution to the water to be treated or the separation membrane module; a chemical solution storage tank 10 which stores the chemical solution; an air blower 11 which is an air supply source for the air scrubbing of the separation membrane module 3; an air scrubbing valve 12 which is opened when air is supplied to a lower portion of the separation membrane module 3 and the air scrubbing is performed; a drain valve 13, a primary side treated water supply valve 14, and a water to be treated bypass valve 15 which are opened when the water to be treated or cleaning wastewater on a primary side of the separation membrane module 3 is discharged; a primary side supply pressure sensor 16; a secondary side pressure sensor 17; a water quality sensor 18 which measures water quality of the water to be treated; and a supplied chemical solution sensor 19. As the water quality sensor 18, a sensor is common that measures a turbidity, a SS, and a water temperature, and in addition, a sensor may be provided that measures a TOC, a COD, organic components such as an oil component, and inorganic components such as Mn and Fe. Examples of the supplied chemical solution sensor 19 include a sensor that detects a pH, an ORP, a residual chlorine concentration, a chemical solution storage tank liquid level, and the like. The water to be treated is a solution to be treated using the separation membrane module, and examples thereof include river water, groundwater, seawater, sewage-treated water, factory wastewater, a culture solution, and the like.

A pore size of a separation membrane used in the separation membrane module 3 is not particularly limited, and a microfiltration membrane (MF membrane), or an ultrafiltration membrane (UF membrane), or a combination of both the microfiltration membrane and the ultrafiltration membrane may be used depending on desired properties and a desired amount of the water to be treated. For example, when it is desired to remove suspended solids, *Escherichia coli, cryptosporidium*, and the like, either the MF membrane or the UF membrane may be used, but when it is desired to remove viruses, polymeric organic substances, and the like, the UF membrane is preferably used. A form of the separation membrane may be any of a hollow fiber membrane, a flat membrane, a tubular membrane, a monolith membrane, and the like. A form of the separation membrane may be any of a hollow fiber membrane, a flat membrane, a tubular membrane, a monolith membrane, and the like. A material of the separation membrane preferably includes at least one selected from the group consisting of polyethylene, polypropylene, polyacrylonitrile, an ethylene-tetrafluoroethylene copolymer, polychlorotrifluoroethylene, polytetrafluoroethylene, polyvinyl fluoride, a tetrafluoroethylene-hexafluoropropylene copolymer, a tetrafluoroethylene-perfluoroalkyl vinyl ether copolymer, a chlorotrifluoroethylene-ethylene copolymer, polyvinylidene fluoride, polysulfone, cellulose acetate, polyvinyl alcohol, polyether sulfone, and inorganic materials such as ceramics. Further, polyvinylidene fluoride (PVDF) is more preferred in view of a membrane strength and chemical resistance, and polyacrylonitrile is more preferred in view of high hydrophilicity and improved contamination resistance. Here, the separation membrane module 3 may be an external pressure type or an internal pressure type, but is preferably the external pressure type in view of easiness of pretreatment.

Figure 2:
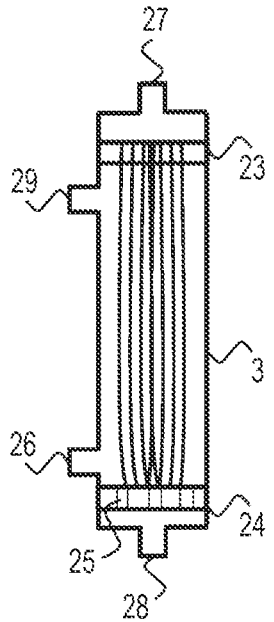
FIG. 2 is a schematic cross-sectional view showing an example of a pressurization type separation membrane module according to the embodiment of the present invention.

FIG. 2 is a schematic cross-sectional view showing an example of a pressurization type hollow fiber membrane module. That is, in FIG. 2, the separation membrane module 3 includes the hollow fiber membrane module. The hollow fiber membrane module includes: an upper bonding portion 23 bonded and fixed to a cylindrical case by an adhesive in a state where a plurality of hollow fiber membranes are opened; and a lower bonding portion 24 bonded and fixed to the cylindrical case by an adhesive in a state where an end surface of each of the hollow fiber membranes is closed. The lower bonding portion 24 is formed with a plurality of air diffusion holes 25. Further, the hollow fiber membrane module includes: a lower side surface nozzle 26 serving as a water to be treated supply port; an upper end surface nozzle 27 serving as a treated water discharge port or a backwash water supply port; a lower end surface nozzle 28 serving as an air supply port, a drain port or a water to be treated supply port; and an upper side surface nozzle 29 through which cleaning wastewater and air are discharged.

Figure 3:
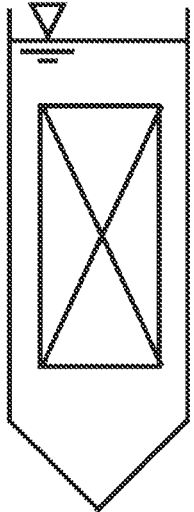
FIG. 3 is a schematic cross-sectional view showing another example of the pressurization type separation membrane module according to the embodiment of the present invention.

A membrane filtration system may be a dead-end filtration type module or a cross-flow filtration type module, but is preferably the dead-end filtration type module in view of low energy consumption. Further, the membrane filtration system may be a pressurization type module or an immersion type module shown in FIG. 3, but is preferably the pressurization type module because filtration operation at a high flux is possible. The "primary side" refers to a side to which the water to be treated is supplied in a space partitioned by the separation membrane, and a "secondary side" refers to a side of filtered water obtained by filtering the water to be treated by the separation membrane.

A water to be treated treatment step performed by the fresh water generator 22 includes a filtration step, a first cleaning step, and a second cleaning step, and the first cleaning step is performed in order to recover a resistance accumulated in the filtration step. Generally, the fresh water generator is operated by repeating the filtration step and the first cleaning step, but the resistance which is not recovered in the first cleaning step is accumulated as the operation continues, and thus the second cleaning step is performed after the filtration step or the first cleaning step. At this time, a resistance increase rate of the resistance accumulated during the filtration step is calculated based on a resistance increase in each filtration step. A resistance increase rate temporal change when the first cleaning step is performed a plurality of times is calculated as a temporal change A in the resistance increase rate, and a resistance increase rate temporal change when the second cleaning step is performed a plurality of times is calculated as a temporal change B in the resistance increase rate. Then, the temporal change A in the resistance increase rate or the temporal change B in the resistance increase rate is compared with a reference value, and a cleaning trouble is determined based on a change amount or a change rate thereof. Details of each step and details of calculation of the resistance increase rate will be described below.

In the fresh water generator 22, the water to be treated is supplied to the primary side in the separation membrane module 3 by operating the water to be treated supply pump 1 and opening the water to be treated supply valve 2 and the air vent valve 4. After the primary side is filled with the water to be treated, the air vent valve 4 is closed and the treated water discharge valve 5 is opened to perform the filtration step by a separation membrane provided in the separation membrane module 3. A flocculant may be added to the water to be treated in view of treated water quality and membrane filtration performance. Examples of the flocculant include polyaluminum chloride, polyaluminum sulfate, ferric chloride, polyiron, ferric sulfate, polysilicate iron, and the like. The process proceeds to the filtration step in which the treated water is transferred from the secondary side in the separation membrane module 3 to the treated water storage tank 6 through the treated water discharge 5. In a case of dead-end filtration, all of the air vent valve 4, the backwashing valve 8, the air scrubbing valve 12, and the drain valve 13 are closed. A transmembrane pressure (TMP) is measured according to the following equation by using the primary side supply pressure sensor 16 and the secondary side pressure sensor 17 during the filtration step, and a filtration resistance R is calculated. μ indicates a viscosity (Pa s), and J indicates a filtration flux (m/s). A frequency of TMP measurement is not particularly limited, but it is preferred to perform the measurement at a frequency of once per several seconds to several minutes in view of analysis accuracy.

TMP=primary side pressure−secondary side pressure

[Equation 5]

$$R\text{(filtration resistance)} = \frac{TMP\text{(transmembrane pressure)}}{\mu\text{(viscosity)} \times J\text{(filtration flux)}} \tag{5}$$

Figure 4:
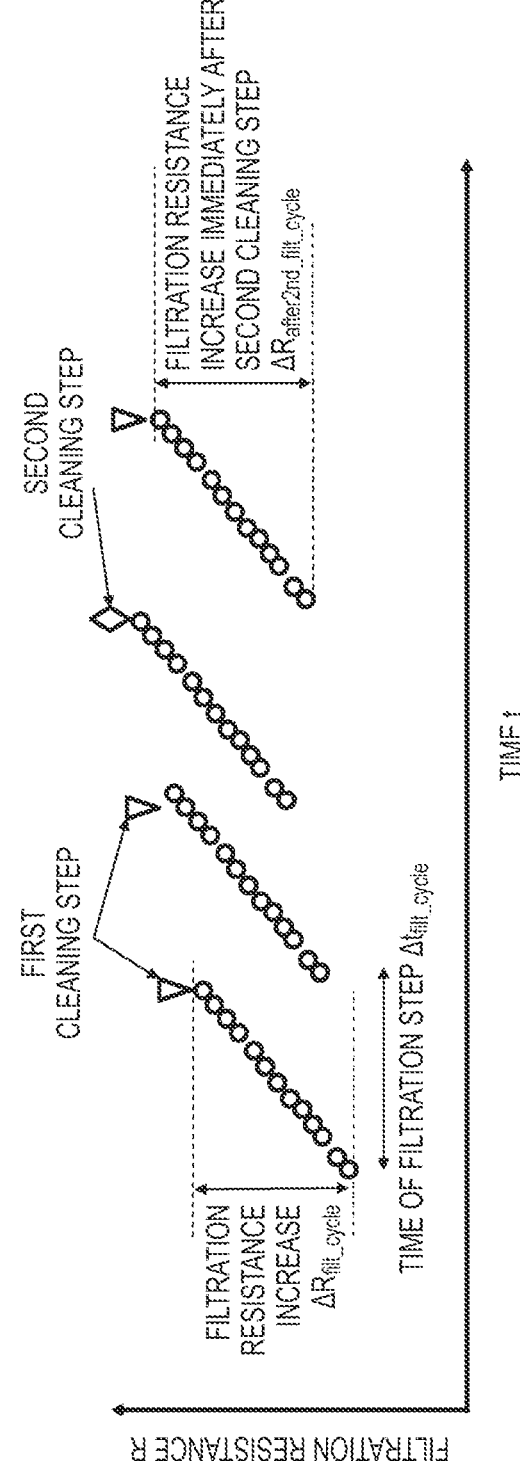
FIG. 4 is an image diagram showing a resistance increase according to the embodiment of the present invention.

A filtration resistance, that is, the TMP of the separation membrane increases with elapsed filtration time. In order to reduce the increase, the filtration resistance is periodically recovered by the first cleaning step. At this time, a filtration resistance increase rate immediately before proceeding to the first cleaning step is calculated by the following equation. FIG. 4 shows an example of the filtration resistance increase during the filtration step, a time of the filtration step, and a filtration resistance increase immediately after the second cleaning step. As shown in FIG. 4, the filtration resistance increase rate can be calculated by a resistance change $\Delta R_{filt\_cycle}$ during the filtration step and a time $\Delta t_{filt\_cycle}$ of the filtration step.

[Equation 6]

$$\text{resistance increase during filtration step} = \frac{\Delta R_{filt\_cycle}}{\Delta t_{filt\_cycle}} \quad (6)$$

Here, since the resistance increase during the filtration step is influenced by the water quality, it is desirable to correct the resistance increase rate during the filtration step by the water quality sensor 18 provided in the device, and it is possible to obtain a correlation equation by recording a relationship between the water quality sensor and the resistance increase rate during the filtration step. The correlation equation can be obtained from the resistance increase rate during the filtration step and acquired data by the water quality sensor as, for example, a regression line or a regression curve obtained by a least square method. A change in the resistance increase rate due to influence of the water quality can be corrected by the regression line or the regression curve.

In the first cleaning step, a backwashing step, an air scrubbing step, a drainage step, and a water supply step are generally performed in this order, but the backwashing step and the air scrubbing step may be performed simultaneously, the backwashing step may be performed after the drainage step, or any one of the steps may be omitted or performed a plurality of times. After the water to be treated supply pump 1 is stopped and the filtration step in the separation membrane (hollow fiber membrane) module 3 is stopped in the backwashing step, the water to be treated supply valve 2 and the treated water discharge valve 5 are closed, the backwashing valve 8 and the air vent valve 4 are opened, the backwashing pump 7 is operated, and thus the backwashing step is performed. Backwash water is not particularly limited, but the treated water obtained by filtering the water to be treated by the separation membrane module as in the present embodiment is preferably used, and industrial water, purified water, tap water, RO membrane permeated water, or pure water may also be used. A time for backwashing is not particularly limited, but is preferably in a range of 1 second to 120 seconds. If a time for one backwashing is less than 1 second, a sufficient cleaning effect cannot be obtained, and if the time exceeds 120 seconds, an operation rate and a water recovery rate of the separation membrane module are reduced. A low concentration chemical solution may be added during the backwashing step. The chemical solution preferably contains at least one of sodium hypochlorite, chlorine dioxide, hydrogen peroxide, ozone, and the like because a cleaning effect on organic substances is high, and the chemical solution preferably contains one or more of hydrochloric acid, sulfuric acid, nitric acid, citric acid, oxalic acid, and the like because a cleaning effect on aluminum, iron, manganese, and the like is high. A concentration of the chemical solution is preferably from several mg/L to several tens of mg/L.

After the backwashing step ends, the process proceeds to the air scrubbing step of performing cleaning by stopping the backwashing pump 7, closing the backwashing valve 8, opening the air scrubbing valve 12, and operating the air blower 11 to supply air to the separation membrane module 3. A time for air scrubbing is not particularly limited, but is preferably in a range of 1 second to 120 seconds. If a time for one backwashing is less than 1 second, a sufficient cleaning effect cannot be obtained, and if the time exceeds 120 seconds, an operation rate of the separation membrane module is reduced. During the course of the backwashing step, the air scrubbing step may be introduced by opening the air scrubbing valve 12 and operating the air blower 11. After the air scrubbing step ends, the process proceeds to the drainage step of draining all the cleaning wastewater accumulated in the separation membrane module 3 by stopping the air blower 11, closing the air scrubbing valve 12, and opening the drain valve 13. Thereafter, the process returns to a water to be treated supply step, and membrane filtration operation is continued. It is common to perform the operation while repeating the filtration and the first cleaning step. It is preferred to appropriately set a filtration time according to properties or a membrane filtration flux of the water to be treated, but the filtration time may be continued until a predetermined transmembrane filtration pressure difference is reached.

Figure 5:
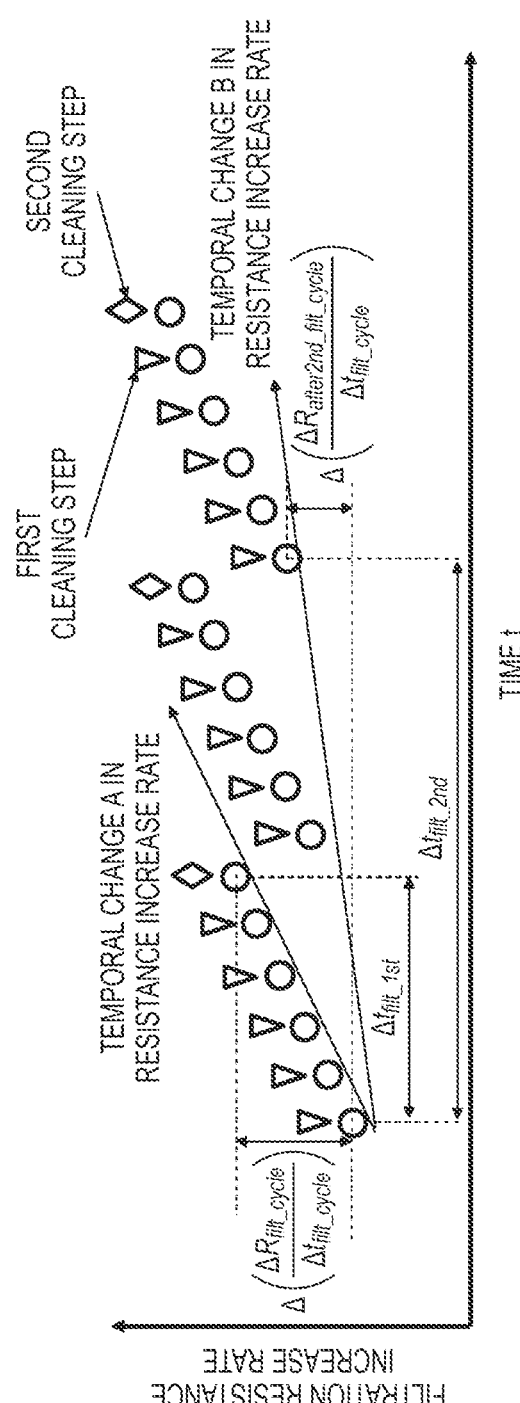
FIG. 5 is an image diagram showing a temporal change in a resistance increase rate according to the embodiment of the present invention.

FIG. 5 shows an example of the filtration resistance increase rate during the filtration step calculated based on the filtration resistance increase, the filtration resistance increase immediately after the second cleaning step, and the time of the filtration step in FIG. 4 when the fresh water generator 22 is operated to repeatedly perform the filtration step, the first cleaning step, and the second cleaning step. $\Delta t_{filt\_1st}$ is a total filtration time between the first cleaning steps when the first cleaning step and the filtration step shown in FIG. 5 are repeated a plurality of times, and after the filtration step and the first cleaning step are repeated a plurality of times, the temporal change A in the resistance increase rate is calculated by a slope of the regression line obtained by the least square method, or the following equation.

[Equation 7]

$$\text{temporal change } A \text{ in resistance increase rate} = \frac{\Delta \left( \frac{\Delta R_{filt\_cycle}}{\Delta t_{filt\_cycle}} \right)}{\Delta t_{filt\_1st}} \quad (7)$$

In the fresh water generator 22, cleaning is not sufficient only by the first cleaning step, and the second cleaning step is performed at a frequency of once every week to several times per day. In the second cleaning step, the water to be treated supply valve 2 and the treated water discharge valve 5 are closed, the backwashing valve 8 and the air vent valve 4 are opened, the backwashing pump 7 and the chemical solution supply pump 9 are operated, and the cleaning is performed with a relatively high concentration chemical solution. The chemical solution can be selected after appropriately setting a concentration and a contact time that do not cause the membrane to be deteriorated, the chemical solution preferably contains at least one of sodium hypochlorite, chlorine dioxide, hydrogen peroxide, ozone, and the like because a cleaning effect on the organic substances is high, and the chemical solution preferably contains one or more of hydrochloric acid, sulfuric acid, nitric acid, citric acid, oxalic acid, and the like because a cleaning effect on aluminum, iron, manganese, and the like is high. A concentration of the chemical solution is preferably 50 mg/L to 10,000 mg/L. This is because if the concentration is less than 50 mg/L, the cleaning effect is insufficient, whereas if the concentration is higher than 10,000 mg/L, cost of the chemical solution increases, which is uneconomical. Using two or more kinds of chemical solutions in order is more preferred than using one kind of chemical solution, and it is more preferred to alternately use, for example, an acid and sodium hypochlorite. The chemical solution is preferably supplied from the secondary side to the separation membrane module 3 as in the present embodiment, but the chemical solution may be supplied from the primary side to the separation membrane module 3. In order to further enhance the cleaning effect, a time during which the chemical solution is brought into contact with the separation membrane may be set. The preferred contact time is approximately from 5 minutes to 3 hours. This is because if the time is too long, a time during which the fresh water generator 22 is stopped is increased, and operation efficiency of the fresh water generator 22 is reduced. After the chemical solution is supplied and the contact time with the chemical solution expires, the chemical solution in the separation membrane module is discharged, the air vent valve 4 and the backwashing valve 8 are opened, and the backwashing pump 7 is operated, thereby performing the backwashing step. After the backwashing step ends, the process proceeds to the air scrubbing step of performing the cleaning by stopping the backwashing pump 7, closing the backwashing valve 8, opening the air scrubbing valve 12, and operating the air blower 11 to supply air to the separation membrane module 3. During the course of the backwashing step, the air scrubbing step may be introduced by opening the air scrubbing valve 12 and operating the air blower 11. In the second cleaning step, the chemical solution cleaning step, the backwashing step, the air scrubbing step, and the drainage step are generally performed in this order, but the backwashing step and the air scrubbing step may be performed simultaneously, the backwashing step may be performed after the drainage step, the order of steps may be changed, or any one of the steps may be omitted or performed a plurality of times. As shown in FIG. 4, $\Delta R_{after2nd\_filt\_cycle}$ indicates the resistance change during the filtration step and $\Delta t_{filt\_cycle}$ indicates the time of the filtration step, and at this time, a filtration resistance increase rate in the filtration step immediately after the second cleaning step is calculated by the following equation.

[Equation 8]

$$\text{resistance increase rate during filtration step} \qquad (2)$$
$$\text{immediately after second cleaning step} = \frac{\Delta R_{after2nd\_filt\_cycle}}{\Delta t_{filt\_cycle}}$$

$\Delta t_{filt\_2nd}$ is a total filtration time between the second cleaning steps when the second cleaning step and the filtration step shown in FIG. 5 are repeated a plurality of times, and after the filtration step and the second cleaning step are repeated a plurality of times, the temporal change B in the resistance increase rate is calculated by a slope of the regression line obtained by the least square method, or the following equation.

[Equation 9]

$$\text{temporal change } B \text{ in resistance increase rate} = \frac{\Delta\left(\frac{\Delta R_{after2nd\_filt\_cycle}}{\Delta t_{filt\_cycle}}\right)}{\Delta t_{filt\_2nd}} \qquad (9)$$

The calculation of the temporal change A or B in the resistance increase rate may be performed at each end of the first cleaning step and the second cleaning step, or may be performed at regular time intervals. The change amount or the change rate of each of the calculated temporal change A in the resistance increase rate and the calculated temporal change B in the resistance increase rate from the reference value is calculated, and the cleaning trouble is determined according to the change amount and the change rate. Here, the reference value indicates an initial value, a previous calculation value, or a set value at the time of starting operation of the fresh water generator, at the time of starting operation after cleaning with the chemical solution, or at the time of a previous calculation process.

Since an increase of a change, the change amount, or the change rate of the temporal change A in the resistance increase rate from the reference value is caused by insufficient removal of a fouling substance from the separation membrane module in the first cleaning step, a trouble in the first cleaning step can be determined when the temporal change A in the resistance increase rate is larger than the reference value. Since an increase of a change, the change amount, or the change rate of the temporal change B in the resistance increase rate from the reference value is caused by insufficient removal of a fouling substance from the separation membrane module in the second cleaning step, a trouble in the second cleaning step can be determined when the temporal change B in the resistance increase rate is larger than the reference value. When both the temporal change A in the resistance increase rate and the temporal change B in the resistance increase rate are increased, the change amounts or the change rates of the temporal change A in the resistance increase rate and the temporal change B in the resistance increase rate from the reference are compared with each other. As a result, the trouble in the first cleaning step can be determined when the increase of the change amount or the change rate of the temporal change A in the resistance increase rate from the reference value is larger, and the trouble in the second cleaning step can be determined when the increase of the change amount or the change rate of the temporal change B in the resistance increase rate from the reference value is larger. When insufficiency or the trouble in the first cleaning step is determined, it is possible to reduce an increase in resistance and perform stable operation by controlling a frequency, a backwashing strength, an air scrubbing strength of the first cleaning step, and an order and a combination of the first cleaning step. Here, the backwashing strength refers to a supply flow rate for backwashing and the time for backwashing, and the air scrubbing strength refers to a supply air flow rate and the time for air scrubbing. When insufficiency or the trouble in the second cleaning step is determined, it is possible to reduce an increase in resistance and perform stable operation by controlling a frequency and a cleaning strength of the second cleaning step. The cleaning strength of the second cleaning step can be controlled by changing the concentration of the chemical solution, a chemical solution type, the contact time, an order and a combination of the second cleaning step, and the like. Since a change in physical cleaning condition can be detected by using, as an index, at least one selected from an air flow rate and a backwashing flow rate acquired from an air flow rate sensor 20 and a backwashing flow rate sensor 21, and combining the index in the determination, the trouble in the first cleaning step can be determined with high accuracy. Since a supply amount, the concentration, and a change of the chemical solution can be detected by using, as an index, at least one selected from the pH, the ORP, the residual chlorine concentration, and the chemical solution storage tank liquid level acquired from the supplied chemical solution sensor 19, and combining the index in the determination, the trouble in the second cleaning step can be determined with high accuracy.

That is, when the change amount or the change rate of the temporal change A or B in the resistance increase rate from the reference value is increased, the trouble in the cleaning step occurs, and thus the cleaning step of the first or second cleaning step needs to be controlled. In particular, when the change amount of the temporal change A or the temporal change B in the resistance increase rate from the reference value is increased by 20% or more with respect to an initially or previously calculated resistance increase rate, or when a change ratio exceeds 1.2 with respect to the initially or previously calculated resistance increase rate, the pressure difference may be increased rapidly, and thus it is preferred to promptly control a first or second cleaning condition.

When the change amounts or the change rates of the temporal change A in the resistance increase rate and the temporal change B in the resistance increase rate from the reference value are increased by the same amounts, both controlling of the frequency, the backwashing strength, the air scrubbing strength of the first cleaning step, the order and the combination of the first cleaning step, and controlling of the frequency and the cleaning strength of the second cleaning step may be performed, but it is preferred to prioritize controlling of the first cleaning step having a higher cleaning frequency. Prioritizing the controlling of the first cleaning step means that when the change amounts or the change rates of the temporal change A in the resistance increase rate and the temporal change B in the resistance increase rate from the reference value are both increased, the controlling of the frequency, the backwashing strength, the air scrubbing strength of the first cleaning step, and the order and the combination of the first cleaning step are first performed, the change amounts or the change rates of the temporal change A in the resistance increase rate and the temporal change B in the resistance increase rate from the reference value are then confirmed, and the controlling of the second cleaning step is then performed when each temporal change in the resistance increase rate does not change.

Figure 6:
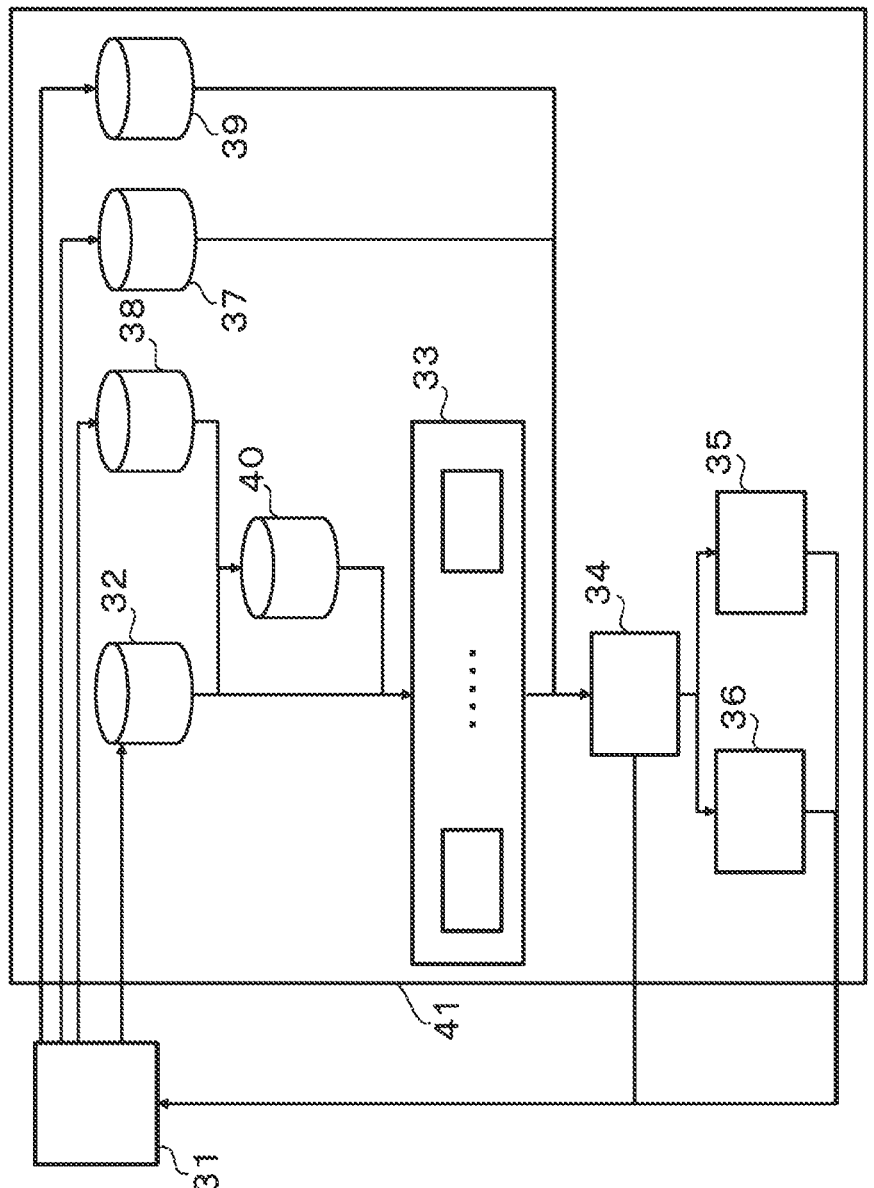
FIG. 6 is a schematic diagram showing an embodiment of the present invention.

A trouble determination program according to an embodiment of the present invention is generally stored and installed in a computer-readable storage medium together with a control management system such as a programmable logic controller (PLC) or a distributed control system (DCS) which is generally installed in the fresh water generator, or the trouble determination program is generally stored and installed in a storage medium of an on-premises server installed at any location or a cloud server by taking out, using a remote monitoring device, operation data via the Internet from the control management system. Further, the cleaning trouble determination program according to the embodiment of the present invention is characterized by including the following units, for example, as shown in FIG. 6.

A cleaning trouble determination program 41 is introduced that causes a computer 31 to function as a resistance increase rate temporal change calculation unit 32, a resistance increase rate temporal change recording unit 33, a cleaning trouble determination unit 34, a first cleaning step condition changing unit 35, a second cleaning step changing unit 36, a chemical solution supply recording unit 37, a water to be treated quality recording unit 38, a cleaning condition recording unit 39, and a correction unit 40. The resistance increase rate temporal change calculation unit 32 calculates the temporal changes A and B in the resistance increase rate. The resistance increase rate temporal change recording unit 33 records the temporal changes A and B in the resistance increase rate which are calculated by the resistance increase rate temporal change calculation unit 32. The cleaning trouble determination unit 34 compares the change amounts or the change rates from the reference value recorded in the resistance increase rate temporal change recording unit 33, determines the insufficiency or the trouble in the first cleaning step when the increase of the temporal change A in the resistance increase rate is larger, and determines the insufficiency or the trouble in the second cleaning step when the increase of the temporal change B in the resistance increase rate is larger. The first cleaning step condition changing unit 35 changes at least one of the condition and the frequency of the first cleaning step when the insufficiency in the first cleaning step is determined. The second cleaning step changing unit 36 changes at least one of the condition and the frequency of the second cleaning step when the insufficiency in the second cleaning step is determined. The chemical solution supply recording unit 37 records the pH, the ORP, the residual chlorine concentration, and the chemical solution storage tank liquid level in a chemical solution supply line. The water to be treated quality recording unit 38 records at least one of water to be treated quality data among a turbidity, an organic substance concentration, an inorganic substance concentration, a flocculant concentration, a water temperature, and a viscosity. The cleaning condition recording unit 39 records at least one of cleaning condition data among the air flow rate and the backwashing flow rate. The correction unit 40 corrects, by the water to be treated quality data recorded in the water to be treated quality recording unit 38, a calculation result obtained by the resistance increase rate temporal change calculation unit 32.

The present application is based on Japanese Patent Application No. 2020-59606 filed on Mar. 30, 2020, the contents of which are incorporated herein by reference.

REFERENCE SIGNS LIST

1: water to be treated supply pump
2: water to be treated supply valve
3: separation membrane module
4: air vent valve
5: treated water discharge valve
6: treated water storage tank
7: backwashing pump
8: backwashing valve
9: chemical solution supply pump
10: chemical solution storage tank
11: air blower
12: air scrubbing valve
13: drain valve
14: primary side treated water supply valve
15: water to be treated bypass valve
16: primary side supply pressure sensor
17: secondary side pressure sensor
18: water to be treated quality sensor
19: supplied chemical solution sensor
20: air flow rate sensor
21: backwashing flow rate sensor
22: fresh water generator
23: upper bonding portion
24: lower bonding portion
25: air diffusion hole 26: lower side surface nozzle serving as a water to be treated supply port 27: upper end surface nozzle serving as a treated water discharge port or a backwash water supply port 28: lower end surface nozzle serving as an air supply port, a drain port, or a water to be treated supply port 29: upper side surface nozzle through which cleaning wastewater and air are discharged 31: computer 32: resistance increase rate temporal change calculation unit 33: resistance increase rate temporal change recording unit 34: cleaning trouble determination unit 35: first cleaning step condition changing unit 36: second cleaning step changing unit 37: chemical solution supply recording unit 38: water to be treated quality recording unit 39: cleaning condition recording unit 40: correction unit 41: cleaning trouble determination program

The invention claimed is:

1. A method for determining cleaning trouble in a fresh water generator, the method comprising:

a filtration step of filtering water to be treated by a separation membrane to obtain treated water;

a first cleaning step of cleaning the separation membrane at the end of the filtration step; and a second cleaning step of chemically cleaning the separation membrane with a chemical solution having a concentration of 50 mg/L to 10,000 mg/L performed following performance of the filtration step and/or the first cleaning step a plurality of times, wherein when a temporal change A in a resistance increase rate between performance of the first cleaning step a plurality of times which is calculated based on a resistance increase rate during performance of the filtration step a plurality of times is larger than a reference value, insufficiency or trouble in the first cleaning step is determined, and when a temporal change B in a resistance increase rate between performance of the second cleaning step a plurality of times is larger than a reference value, insufficiency or trouble in the second cleaning step is determined, wherein the temporal change A in the resistance increase rate is calculated by a slope of a regression line obtained by a least square method or by the following Equation (1) and the temporal change B in the resistance increase rate is calculated by a slope of a regression line obtained by a least square method or by the following Equation (2):

[Equation 1]

$$\frac{\Delta\left(\dfrac{\Delta R_{filt\_cycle}}{\Delta t_{filt\_cycle}}\right)}{\Delta t_{filt\_1st}} = \text{temporal change } A \text{ in resistance increase rate} \quad (1)$$

$\Delta R_{filt\_cycle}$: resistance increase during filtration step $\Delta t_{filt\_cycle}$: time of filtration step $\Delta t_{filt\_1st}$: total filtration time between first cleaning steps

[Equation 2]

$$\frac{\Delta\left(\dfrac{\Delta R_{after2nd\_filt\_cycle}}{\Delta t_{filt\_cycle}}\right)}{\Delta t_{filt\_2nd}} = \text{temporal change } B \text{ in resistance increase rate} \quad (2)$$

$\Delta R_{after2nd\_filt\_cycle}$: resistance increase during filtration step immediately after second cleaning step $\Delta t_{filt\_2nd}$: total filtration time between second cleaning steps.

2. The method for determining cleaning trouble in a fresh water generator according to claim 1, wherein change amounts or change rates of the temporal change A in the resistance increase rate and the temporal change B in the resistance increase rate from a reference value are compared, insufficiency or a trouble in the first cleaning step is determined when an increase of the temporal change A in the resistance increase rate is larger, and insufficiency or a trouble in the second cleaning step is determined when an increase of the temporal change B in the resistance increase rate is larger.

3. The method for determining cleaning trouble in a fresh water generator according to claim 1, wherein in determination of the cleaning trouble in the second cleaning step, the cleaning trouble in the second cleaning step is determined by combining at least one selected from a pH, an oxidation-reduction potential (ORP), a residual chlorine concentration, and a chemical solution storage tank liquid level of the chemical solution as an index.

4. The method for determining cleaning trouble in a fresh water generator according to claim 1, wherein the resistance increase rate during performance of the filtration step is corrected by a regression line correlating to at least one of water to be treated quality data among a turbidity, an organic substance concentration, an inorganic substance concentration, a flocculant concentration, a water temperature, and a viscosity.

5. A method for operating a fresh water generator, the method comprising:

changing at least one of a condition and a frequency of the first cleaning step when insufficiency or a trouble in the first cleaning step is determined by the method for determining cleaning trouble according to claim 1, and changing at least one of a condition and a frequency of the second cleaning step when insufficiency or a trouble in the second cleaning step is determined by the method for determining cleaning trouble.

6. A system for determining cleaning trouble in a fresh water generator, the system being configured to perform:

a filtration step of filtering water to be treated by a separation membrane to obtain treated water;

a first cleaning step of cleaning the separation membrane at the end of the filtration step; and a second cleaning step of chemically cleaning the separation membrane with a chemical solution having a concentration of 50 mg/L to 10,000 mg/L performed following performance of the filtration step and/or the first cleaning step a plurality of times, wherein the system comprises a processor configured to:

use a resistance increase rate during the filtration step, a temporal change A in the resistance increase rate between performance of the first cleaning step a plurality of times by a slope of a regression line obtained by a least square method or by the following Equation (3) and a temporal change B in a resistance increase rate between performance of the second cleaning step a plurality of times by a slope of a regression line obtained by a least square method or by the following Equation (4);

record a calculation result of the calculated temporal change A in the resistance increase rate; and determine insufficiency or a trouble in the first cleaning step when the temporal change A in the resistance increase rate is larger than a reference value and determine insufficiency or a trouble in the second cleaning step when the temporal change B in the resistance increase rate is larger than a reference value

[Equation 3]

$$\frac{\Delta\left(\dfrac{\Delta R_{filt\_cycle}}{\Delta t_{filt\_cycle}}\right)}{\Delta t_{filt\_1st}} = \text{temporal change } A \text{ in resistance increase rate} \quad (3)$$

$\Delta R_{filt\_cycle}$: resistance increase during filtration step
$\Delta t_{filt\_cycle}$: time of filtration step
$\Delta t_{filt\_1st}$: total filtration time between first cleaning steps

[Equation 4]

$$\frac{\Delta\left(\dfrac{\Delta R_{after2nd\_filt\_cycle}}{\Delta t_{filt\_cycle}}\right)}{\Delta t_{filt\_2nd}} = \text{temporal change } B \text{ in resistance increase rate} \quad (4)$$

$\Delta R_{after2nd\_filt\_cycle}$: resistance increase during filtration step immediately after second cleaning step
$\Delta t_{filt\_2nd}$: total filtration time between second cleaning steps.

7. The system according to claim 6, wherein the processor is configured to:

record calculation results of the calculated temporal changes A and B in the resistance increase rate; and compare change amounts or change rates of the temporal change A in a resistance increase rate and the temporal change B in a resistance increase rate from a reference value, determine insufficiency or a trouble in the first cleaning step when an increase of the temporal change A in the resistance increase rate is larger, and determine insufficiency or a trouble in the second cleaning step when an increase of the temporal change B in the resistance increase rate is larger.

8. The system according to claim 6, wherein the processor is configured to:

change at least one of a condition and a frequency of the first cleaning step when insufficiency in the first cleaning step is determined; and change at least one of a condition and a frequency of the second cleaning step when insufficiency in the second cleaning step is determined.

9. The system according to claim 6, wherein the processor is configured to:

record a pH, an ORP, a residual chlorine concentration, and a chemical solution storage tank liquid level in a chemical solution supply line; and combine, as an index, at least one in determination of cleaning trouble.

10. The program-system for determining cleaning trouble according to claim 6, wherein the processor is configured to:

record at least one of water to be treated quality data among a turbidity, an organic substance concentration, an inorganic substance concentration, a flocculant concentration, a water temperature, and a viscosity in calculation of the resistance increase rate during the filtration step; and correct, by the water to be treated quality data.

11. A computer-readable storage medium storing a program for determining cleaning trouble in a fresh water generator in the system according to claim 6.

* * * * *